Figure 1:
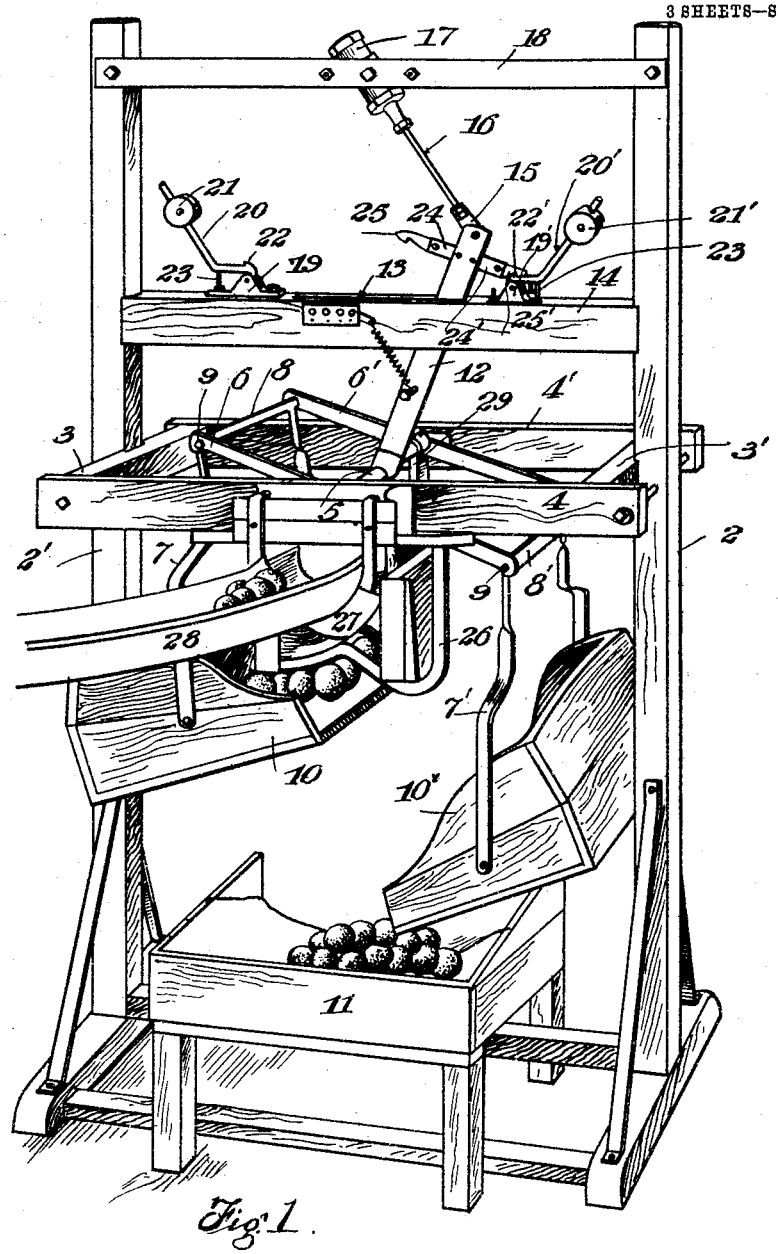

No. 783,078. PATENTED FEB. 21, 1905.
E. H. RICHARDSON.
AUTOMATIC WEIGHING MACHINE.
APPLICATION FILED JAN. 25, 1904.

3 SHEETS—SHEET 1.

WITNESSES
INVENTOR
Earl H. Richardson
by Townsend Bros
his attys

No. 783,078. PATENTED FEB. 21, 1905.
E. H. RICHARDSON.
AUTOMATIC WEIGHING MACHINE.
APPLICATION FILED JAN. 25, 1904.
3 SHEETS—SHEET 2.
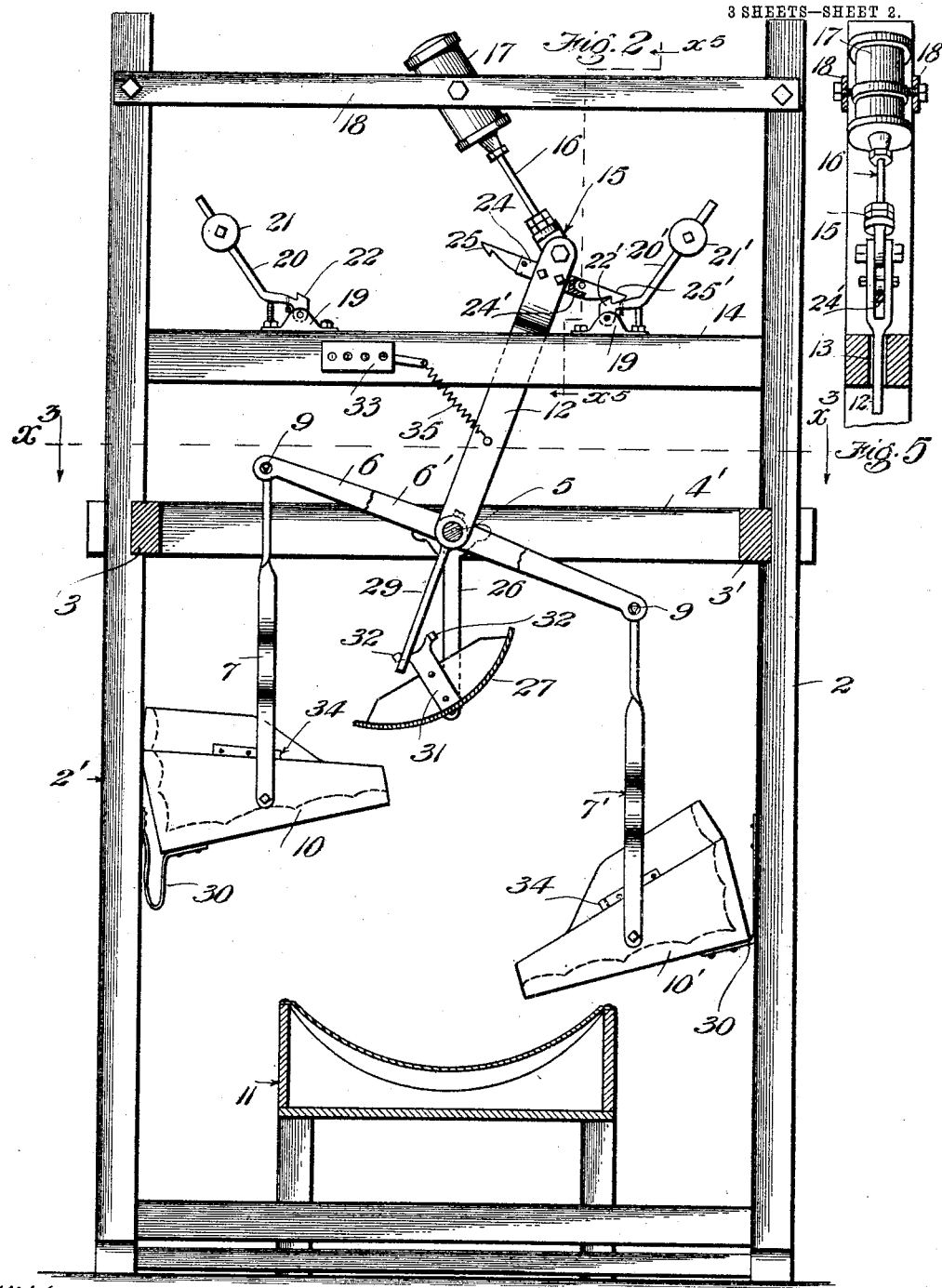
Witnesses
Inventor
Earl H. Richardson
by Townsend Bros
His attys

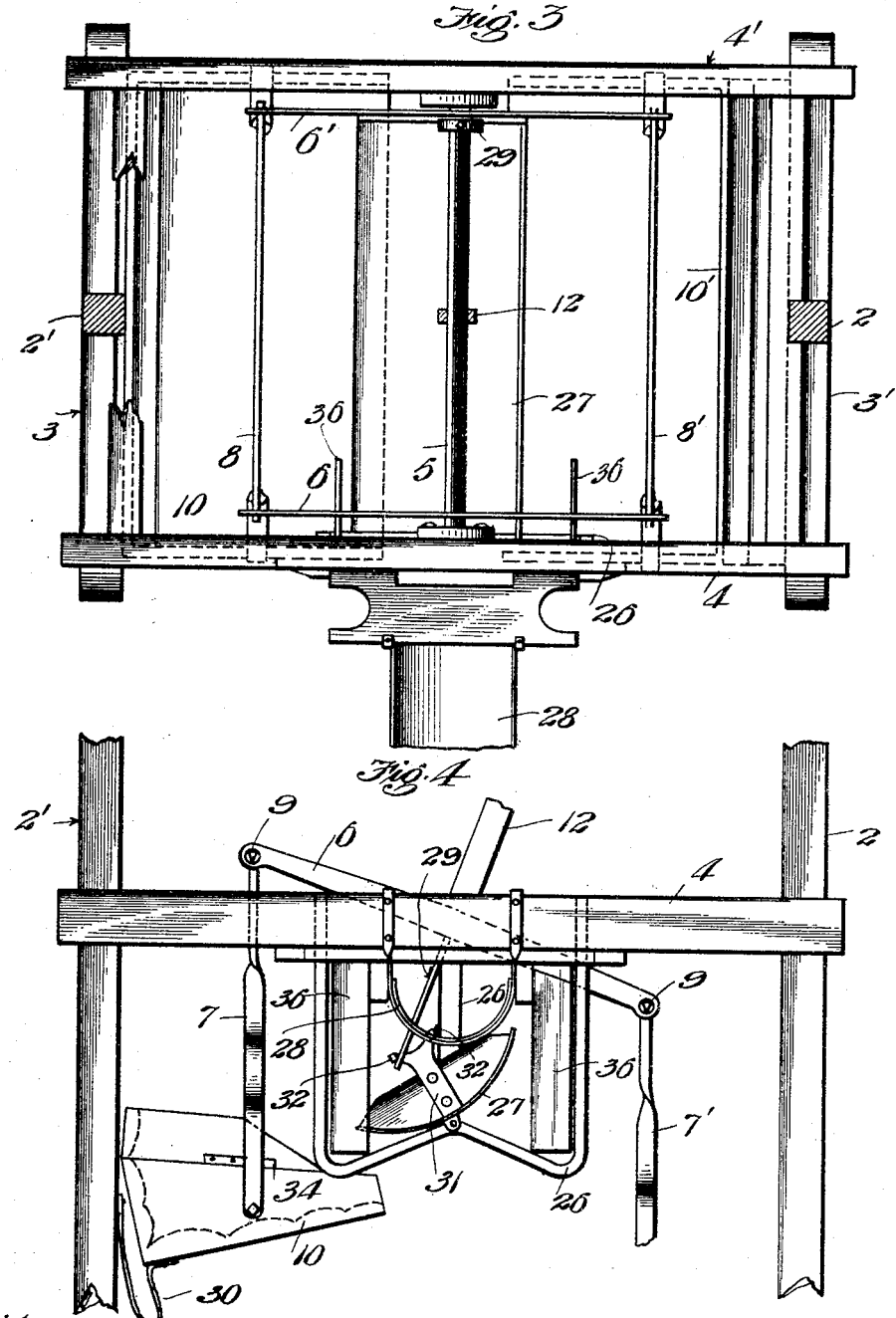

No. 783,078. Patented February 21, 1905.

UNITED STATES PATENT OFFICE.

EARL H. RICHARDSON, OF ONTARIO, CALIFORNIA, ASSIGNOR TO PACKING-HOUSE EQUIPMENT COMPANY, OF UPLAND, CALIFORNIA, A CORPORATION OF CALIFORNIA.

AUTOMATIC WEIGHING-MACHINE.

SPECIFICATION forming part of Letters Patent No. 783,078, dated February 21, 1905.

Application filed January 25, 1904. Serial No. 190,449.

*To all whom it may concern:*

Be it known that I, EARL H. RICHARDSON, a citizen of the United States of America, residing at Ontario, county of San Bernardino, and State of California, have invented certain Improvements in Automatic Weighing-Machines, of which the following is a specification.

This invention relates to automatic weighing-machines, and has for its primary object the provision of a device which will automatically weigh and deliver into a suitable receptacle the fruits, other objects, or material to be weighed, such fruits being continuously delivered to the weighing mechanism.

A further object is to provide such means in such form that the fruits roll from the feed-trough into the weighing-receptacles and are automatically rolled out therefrom into a suitable hopper or receiving device without jarring and without any perceptible fall, thereby avoiding all possibility of bruising or injuring the fruits.

The invention consists, primarily, of a reciprocating frame or beam provided with receptacles, preferably at opposite sides of its fulcrum, automatically-releasing locking mechanism adapted to hold said receptacles in position to receive their loads, means for delivering fruits to said receptacles as they are alternately brought to position for loading, and a receiving hopper or device into which the fruits are rolled from said receptacles after said receptacles have received their predetermined loads.

The invention consists, further, in means for cushioning the drop or reciprocation of said receptacles, so as to prevent any jarring of the fruits upon the reciprocation of the beam, thereby avoiding the bruising of the fruits.

More specifically, the invention consists in a reciprocating beam or frame provided with receptacles at opposite sides of its fulcrum, automatically-releasing locking mechanism adapted to alternately hold said receptacles in position to receive their loads, tiltingly-mounted means for directing the fruits to the receptacle in position to receive a load, means for feeding fruits to said directing means, and a receiving hopper or device positioned to receive the fruits from said receptacles, said directing means automatically operated by the reciprocation of said frame to direct the fruits into the receptacle in position for receiving a load.

The invention consists, further, in general and subcombination of devices or mechanisms and in constructions of parts, all as hereinafter described, and particularly pointed out in the claims.

This invention will be more readily understood by reference to the accompanying drawings, forming part of this specification, in which—

Figure 1 is a perspective view of an automatic weighing-machine embodying the invention. Fig. 2 is a side elevation, certain parts being broken away. Fig. 3 is a horizontal section on the line $x^3$ $x^3$, Fig. 2. Fig. 4 is a partial side elevation showing particularly the means for supporting the tilting director. Fig. 5 is a vertical section on line $x^5$ $x^5$ in Fig. 2.

The main frame of the machine may be of any suitable or preferred construction. As shown in the drawings, it has two uprights or vertical standards 2 2', mounted upon a suitable base. About midway the length of the standards 2 2' is a horizontal support on these standards and composed of end pieces 3 3' and side pieces 4 4'. Within this frame the reciprocating beam or frame is pivoted. The shaft or fulcrum 5 of the reciprocating frame has its bearings in the respective side pieces 4 4'. These bearings are knife-edge in order to eliminate as far as possible all friction. The reciprocating frame is made up of side bars 6 6', through the centers of which the shaft or fulcrum 5 passes.

7 7' represent hangers which are provided with downwardly-extending legs and a horizontal portion 8 8', having lugs adapted to project through bearings in the ends of the side bars 6 6' and suitably retained in place either by nuts or by pins passing through the lugs. These lugs 9 also have knife-edge bearings, so as to avoid as much as possible friction. The legs of the brackets 7 7' are pivoted at their lower ends to receptacles 10 10', which, as shown, are open at their tops and inner sides. The receptacles 10 10' are provided with straps 30, (see Fig. 2,) attached to their backs and attached to the inside of the respective standards 2' 2, so that when the receptacles are lowered to the position of the receptacle 10' in Fig. 1 the receptacle is thereby tilted into the position of the receptacle 10' and the fruits or other articles weighed will roll out therefrom into the hopper 11 beneath the reciprocating frame.

The lever or arm 12 is fixed on the fulcrum 5, as shown, and extends upwardly through a slot 13 in a cross-piece 14 of the frame. The upper end of this lever is forked, and in the fork is pivoted a member 15, to which a rod 16 is attached. This rod is attached to a piston in the air-cylinder 17, pivoted between two cross-bars 18 at the upper ends of the standards 2 2'.

The pivotal connection of the air-cushion means with the frame carrying the receptacles is such that in the reciprocation of said frame the pivotal member 15 passes from side to side of the dead-center between the pivots of the air-cushion cylinder and of the frame, so that as the frame approaches the central position from either side it will cause compression in the cylinder, and the device will therefore work identically in both directions of reciprocation.

The receptacles 10 10' are provided with stops 34, which when the receptacles are moved and tilt back by their own weight engage with the downwardly-extending legs of hangers 7 or 7' to limit the backward tilting of the receptacles and maintain them in proper position to receive the fruit.

19 19' represent bearings mounted on the upper face of the cross-bar 14. In these bearings are mounted levers 20 20', carrying adjustable weights 21 21', and are provided with hooks 22 22'. Stops 23 23 are provided on the rear ends of the trunnions to prevent the levers 20 20' from falling down out of operative position.

Arms 24 24' extend outwardly from the upper portion of the lever 12, and on the outer ends of these arms are pivoted dogs 25 25', these dogs having also hooks which are adapted to engage with the hooks 22 22' of the counterbalance-levers 20 20'. The dogs 25 are so pivoted that they may swing upwardly from the position shown in Fig. 1 to allow them to engage the hooks of the levers 20 20', but are shouldered to prevent their dropping downwardly out of operative position.

From the respective cross-bars 4 4' depend brackets 26. As shown, the front bracket is in the form of a W, the apex of the center forming the pivot-points at which the tilting director 27 is pivoted. This director is preferably in the form of a trough having a closed rear end and open at its front end and into which the feed-trough 28 is adapted to project and deliver the fruits to be weighed. The tilting director 27 is provided at its rear end with an upwardly-extending arm 31, having inwardly-extending lugs 32.

From the fulcrum or shaft 5 extends an operating-arm 29, the lower arm passing between these lugs, and as the reciprocating frame is reciprocated the director is correspondingly tilted.

33 indicates a register which is connected by suitable means 35 to the lever 12, so as to be operated at each reciprocation. 36 represents guards to guide the fruit into the director 27.

The operation is as follows: The fruit is fed into trough 28 in the usual manner and passes from the same into the tilting director 27, which guides it toward and into the receptacle 10 or 10', which at that time is elevated. The receptacle being held in elevated position close to the tilting director, there is but little fall of the fruit and no liability of injury thereto. The weight of the fruit in the receptacle exercises, through the tilting frame and the arm 12, a pressure upon the locking means, consisting of the catch or dog 25 and hook 22 at one side, the pressure being thus transmitted to the counterbalance-lever and tending to raise the weight thereon. When the proper amount of fruit has run into the receptacle, the pressure on the engaging parts will be sufficient to overcome the weight on the counterbalance-lever, so that the latter will tilt up, allowing the catch or dog to release from the hook, whereupon the tilting frame will be swung over to the other side by the weight of the fruit, the motion being restrained by the air-cushion means. As the loaded receptacle descends its rear end is stopped and held by the strap means 30 aforesaid, thereby tilting its inner end downwardly and dumping the fruit therefrom into the hopper 11. As the fruit completes its tilting movement the catch or dog 25 on the other side will be engaged with the hook 22 of the other counterbalance-lever. Meanwhile the tilting movement of the frame will throw the parts 29 31 32 aforesaid, operated to reversely tilt the director 27, so as to direct the fruit to the other receptacle, which at the same time will be lifted to position directly beneath the tilting director.

What I claim is—

1. An automatic weighing-machine comprising a reciprocating frame or beam provided with receptacles pivoted thereto on opposite sides of its fulcrum, automatically-releasing locking mechanism for holding said receptacles in position for loading and comprising a member on said frame and adjustably-weighted locking means engaging said member, means for delivering fruits to said receptacles as the same are alternately brought to position for loading, and a receiving hopper or device positioned to receive the fruits from said receptacles.

2. An automatic weighing-machine comprising a reciprocating frame or beam provided with receptacles pivoted thereto on opposite sides of its fulcrum, means for delivering fruits to said receptacles as the same are alternately brought to a position for loading, means comprising a member on said frame provided with catches and adjustably-weighted locking-levers having hooks engaging said catches for holding said receptacles in loading position until the same receive a predetermined load, and a receiving hopper or device positioned to receive the fruits from said receptacles.

3. An automatic weighing-machine comprising a reciprocating beam or frame, provided with pivoted receptacles at opposite sides of its fulcrum, tiltingly-mounted means for directing fruits to the receptacle in position for loading, means for feeding fruits to said directing means, means comprising a member on said frame provided with catches and adjustably-weighted locking-levers having hooks engaging said catches for holding said hoppers in loading position until loaded with a predetermined load, said directing means automatically operated by the reciprocation of said beam, and a receiving hopper or device positioned to receive the fruits from said receptacles.

4. The combination with a main frame, of a beam or frame reciprocatingly mounted thereon; supports pivoted on said beam or frame, receptacles pivotally connected with said supports, means for holding said receptacles in loading position, means for feeding fruits to the receptacle in loading position, a receiving hopper or device, and means for tilting said receptacles as the same are reciprocated into unloading position.

5. The combination with a main frame of a beam or frame reciprocatingly mounted thereon, supports pivoted on said beam or frame, receptacles pivotally connected with said supports, means for holding said receptacles in loading position, tilting means for directing the fruits into the receptacle in loading position, means for feeding fruits to said directing means, a receiving hopper or device and means for tilting said receptacles as the same are reciprocated into unloading position.

6. The combination with a main frame of a beam or frame reciprocatingly mounted thereon, supports pivoted on said beam or frame, receptacles pivotally connected with said supports, means for holding said receptacles in loading position, tilting means for directing the fruits into the receptacle in loading position, means automatically operated by said reciprocating frame for reciprocating directing means, means for feeding fruits to said directing means, a receiving hopper or device, and means for tilting said receptacles as the same are reciprocated into unloading position.

7. The combination with a main frame of a beam or frame reciprocatingly mounted thereon, receptacles pivotally connected with said reciprocating frame at opposite sides of its fulcrum, means for delivering fruits to said receptacles as the same are alternately brought to position for loading, an oscillating lever connected with said reciprocating frame, pivoted catches carried by said lever, means on the frame with which said catches engage and a receiving hopper or device positioned to receive the fruits from said receptacles.

8. The combination with a main frame of a beam or frame reciprocatingly mounted thereon, receptacles pivoted thereto on opposite sides of its fulcrum, means for delivering fruits to said receptacles as the same are alternately brought to a position for loading, means for holding said receptacles in loading position until the same receive a predetermined load, a receiving hopper or device positioned to receive the fruits from said receptacles, and means forming an air-cushion adapted to take up the shock of reciprocation of said receptacles, said air-cushion means being connected to said frame by pivotal means passing from side to side of the dead-center in the reciprocating movement of the frame.

In testimony whereof I have signed my name to this specification, in the presence of two subscribing witnesses, at Los Angeles, county of Los Angeles, State of California, this 19th day of January, 1904.

EARL H. RICHARDSON.

Witnesses:
 FREDERICK S. LYON,
 GEORGE T. HACKLEY.